US006722218B1

United States Patent
Fischer et al.

(10) Patent No.: US 6,722,218 B1
(45) Date of Patent: Apr. 20, 2004

(54) SHIFTING DEVICE FOR A VARIABLE SPEED VEHICLE TRANSMISSION

(75) Inventors: Dieter Fischer, Nonnenhorn (DE); Klaus Späth, Berg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/763,941

(22) PCT Filed: Aug. 28, 1999

(86) PCT No.: PCT/EP99/06363
§ 371 (c)(1),
(2), (4) Date: Mar. 12, 2001

(87) PCT Pub. No.: WO00/14439
PCT Pub. Date: Mar. 16, 2000

(30) Foreign Application Priority Data

Sep. 2, 1998 (DE) .......................... 198 40 052

(51) Int. Cl.⁷ .................. F16H 59/00; B60K 20/00; G05G 9/00
(52) U.S. Cl. ....................... 74/335; 74/473.1
(58) Field of Search .............. 74/335, 473.11, 74/473.12, 473.1, 337.5

(56) References Cited

U.S. PATENT DOCUMENTS

| 2,926,539 A | | 3/1960 | Leonard ...................... 74/364 |
| 3,880,015 A | * | 4/1975 | Kranzler et al. ............ 74/337.5 |
| 4,440,037 A | * | 4/1984 | Foxton et al. ................ 74/331 |
| 4,485,726 A | | 12/1984 | Inoue ........................ 91/375 R |
| 4,974,468 A | * | 12/1990 | Reynolds et al. ......... 74/473.19 |
| 5,494,466 A | * | 2/1996 | Vernea ......................... 440/75 |
| 5,740,695 A | * | 4/1998 | Janson ....................... 74/337.5 |
| 5,901,608 A | * | 5/1999 | Takeyama ..................... 74/335 |
| 5,916,326 A | * | 6/1999 | Tischer ......................... 74/335 |
| 6,026,698 A | * | 2/2000 | Weston ......................... 74/335 |

FOREIGN PATENT DOCUMENTS

| DE | 1 625 145 | | 10/1972 |
| DE | 29 27 666 | | 1/1980 |
| DE | 195 39 471 A1 | | 4/1997 |
| DE | 196 10 491 A1 | | 9/1997 |
| EP | 0 251 807 A2 | | 1/1988 |
| FR | 1.188.993 | | 9/1959 |
| JP | 58175033 A | * | 10/1983 |

OTHER PUBLICATIONS

Looman, Johannes. *Zahnradgetriebe*. Grundlagen, Konstruktionen, Anwendungen in Fahrzeugen, Springer–Verlag, Berlin, Germany, 1988, p. 225.

* cited by examiner

Primary Examiner—Matthew C. Graham
Assistant Examiner—Melody M. Burch
(74) Attorney, Agent, or Firm—Davis & Bujold, PLLC

(57) ABSTRACT

The invention shows a shifting device (11, 40) with a servo-assistance device (10) for a transmission (30) of a vehicle. A gear shift linkage (4, 6, 16) is connected with a lever (18) which is connected with a control rod (20) of the assistance device (10) and a gear shift shaft (26, 44) engages in gear shift rails (32) of the transmission (30) by means of levers (28). A central gear shift shaft (44) is provided in the shifting device (40) which is firmly mounted on the transmission housing and can be rotatably actuated by the gear shift linkage (4, 6, 16) actuated by the driver for transmitting the manual shifting force to the disengaging lever (18) of the assistance device (10) and for transmitting the manual shifting force to the gear shift rails (32) of the transmission (30). The central gear shift shaft (44) can also be displaceably actuated by the gear shift linkage (4, 6, 16) to select the gear shift rail (32) to be shifted. The shifting force supplied by the assistance device (10) can be transmitted to an axially fixed hollow shaft (52) in the shifting device (40) which surrounds the central gear shift shaft (44) and can be rotated with the central gear shift shaft (44) to shift the gear shift rails (32).

15 Claims, 4 Drawing Sheets

SHIFTING DEVICE FOR A VARIABLE SPEED VEHICLE TRANSMISSION

According to the preamble of claim 1, the invention relates to a shifting device for variable-speed transmissions of motor vehicles.

In such shifting devices, the rotary motion of the gear shift rods serves to pre-select the individual gear shift gates and, in general, requires no great shifting forces. The axial longitudinal motion of the gear shift rod serves to introduce the desired gear and requires stronger shifting forces, particularly in transmission for heavy vehicles and such vehicles where the driver's seat is situated far from the transmission.

Industrial vehicles, like existing buses and trucks, have spatial conditions necessarily for installing the transmission far from the driver's sear with the design of their forward control, under which the transmission jerks. The distance is especially great in vehicles having under-floor or rear engines. The precise change of gear is often made difficult by long, sometimes rigidly extending, gear shift linkages in a mechanically shifted transmission.

In order that the driver of a motor vehicle can fully turn his attention to the street traffic, he must be, as much as possible, unburdened and assisted in all the actions needed to guide a motor vehicle Every truck driver knows how decisive the perfect control of the variable-speed transmission can be in difficult traffic situations. Pneumatic gear shift aids for industrial vehicles of all sizes can provide relief.

Formerly known servo-gear shift systems are partly attached directly to the transmission and have a control or piston rod accessible from the outside. The gearshift linkage is connected with the control rod. The assistance is activated via a longitudinal motion of the control rod. This type of control is found associated with 2-rod or cable-pull gear shifts. A disadvantage here is the sealing of the control and piston rod by rubber boots and the lack of lubrication. In trucks, this place is more exposed to dirt. When changing the ratio of the gear shift rod, the beginning of the servo-assistance also changes or it must be adapted to the linkage ratio by modifying the valve. The same also applies to gear shift aids consisting of one control valve and servo-cylinder separated from each other. The valve and cylinder are connected by ball joints with the gear shift lever and a bracket which, in turn, is fastened on the transmission. This arrangement still has the added disadvantage that upon each gear shift the parts move relative to the transmission and chassis of the vehicle and thus the air pipes, which the valve and cylinder are interconnected, can wear by rubbing.

Such pneumatic gear shift aids in broken-up design are already known, which consists of one mechanical pneumatic control part and one separate pneumatic power part. A servo-control in broken up design is known from Loomann; Zahnradgetriebe; $2^{nd}$ edition; Springer Editing House; 1988, p. 225. The control part is a mechanically actuated control valve actuated by a gear shift linkage. When changing gear, the selector motion is mechanically transferred directly to the transmission. During transmission of the gear shift movement, the control valve is actuated and, at the same time, the manual shifting force is mechanically transferred via a lever to the transmission. In addition, the manual shifting force is pneumatically assisted by a compressed-air cylinder. At the same time, the compressed air cylinder forms the pneumatic power part as a two-position cylinder with integrated hydraulic damper. A direct proportional representation of the manual shifting force is not obtained here. The paths between control part and power part are long and the installation takes up much space. Damage to the compressed air lines, between control part and power part, cannot be prevented.

EP 0 251 807 has disclosed a transmission where the manual shifting force of the driver is assisted while the selector force is transferred to the transmission without assistance. While the shifting movement is transmitted to a first gear shift shaft, the selector movement is reversed and axially moves a third shaft which is independently rotatable of the first gear shift shaft that transmits the manual force. The servo-assistance is triggered by the first gear shift shaft to the servo element and transmitted by a second gear shift shaft, which is rotatable independently of the first gear shift shaft, to the third gear shift shaft and from there to the gear shift rails. The second and third gear shift shafts are non-rotatably connected with each other, the third gear shift shaft being axially displaceable relative to the second gear shift shaft.

DE 195 39 471 has disclosed a variable speed device where the control valve and the power part are combined to form one structural part. The shifting force is increased in proportion to the driver's shifting force and achieves the same effects as in a hand shifted transmission. The driver does not loose the feel of the gear shift, he can immediately detect a sense of whether a gear has been introduced or how long the synchronization phase lasts. In the gear shifting device, the transmission of the forces to the individual parts remains in need of improvement.

The problem on which the invention is based is to provide a gear shifting device which makes a simplified and reliable shifting with servo-assistance possible while improving the transmission.

The problem is solved by a shifting device having the features of claim 1. Development are object of sub-claims.

According to the invention, in a shifting device firmly mounted on the transmission housing, a central gear shift shaft is provided which is connected to the gear shift linkage actuated by the driver and rotatably actuatable by it. With the gear shift shaft, the manual shifting force is transmitted to the disengaging lever of the assistance device and to the gear shift rails of the transmission. The gear shift shaft can be displaceably actuated by the gear shift linkage to select the gear shift rail to be shifted. The shifting force, supplied by the assistance device, can be transmitted to a hollow shaft which is firmly situated axially in the shifting device, surrounds the central gear shift shaft and is rotatable with the central gear shift shaft to shift the gear shift rails.

In an advantageous development, axially aligned grooves in which the pins engage are provided in the central gear shift shaft. Thereby is formed a non-rotatable, but axially movable connection of the central gear shift shaft with the disengaging lever of the assistance device.

An advantageous development shows the pins rotatably supported in the disengaging lever of the assistance device, the rotatable support of the pins being advantageously provided by needle bushings.

Still one other advantageous development provides a rotatable means between the disengaging lever of the assistance device and the control rod of the assistance device, the rotatable means advantageously being a roller situated on the disengaging lever.

In another advantageous development, the gear shift shaft has in the area of a connection of central gear shift shaft and surrounding hollow shaft openings to accommodate connecting elements between the central gear shift shaft and the hollow shaft. The openings are designed larger than the connecting elements in order to make possible a slight torsion of the gear shift shaft before the hollow shaft is moved along.

The shifting device can be designed as one structural part which, as a complete unit, is adaptable to the transmission housing.

The invention solves the problem of sealing of the longitudinal movement and modification of the valve, the same as the parts moving relative to their surroundings. The mechanics to control the servo-unit and emit the servo-force is supported in a housing in such a manner that by a rotary motion on the gear shift shaft the servo-assistance is activated and is transmitted, via another lever, to a hollow shaft and from there to the transmission. The gear shift shaft is sealed by means of shaft packing rings with scraper and protective cap. In addition, the parts are lubricated via an oil spraying pipe. The gear shift rod ratio, which differs according to type of vehicle and customers, can be adapted to the valve of the servo-unit via a gear shift lever fastened on the gear shift shaft by changing the suspension radius. Thus, in a simple manner, it can be ensured that the same valve and also the same servo unit can be used for all applications.

To connect the pneumatic shifting device to the gear shift linkage rigidly possible, the latter must make possible the following operations:

transfer to the valve of the manual shifting force;

transfer to the transmission of the servo force+manual shifting force dependent on the valve control;

mechanical bridging of the servo-assistance unit;

transfer of the selector forces adaptation of the shifting device to the shift rod.

The problems here consist in that:

the transfer of the manual shifting force as valve control force must be as free of losses as possible;

the selector force must not increase;

the quick change or replacement of the shifting device must be made possible;

the installation space around the transmission, especially toward the chassis of the vehicle, is extensively limited;

an easy and perfect assembly must be made possible;

the servo-assistance must always be the same independent of the remote control ratio;

the oil supply of the pneumatic assistance device and of the mechanical parts must be ensured.

These problems are taken into consideration in the inventive shifting device.

The shifting movement is aided by compressed air as servo-assistance while the selector movement by hand is carried out without assistance. Due to the fact that only one part of the gear change is aided by a servo-assistance, the construction of the shifting device is simplified compared to completely servo-assisted shifting devices. Costs and installation expenditure are considerably reduced, replacement in transmissions already installed is also possible without problems. In addition, the driver can manually shift when, due to damages in the compressed-air system, the compressed air is too scarce or fails completely. To that end, no shifting steps adapted in any manner are required. The braking capacity of the motor vehicle, insofar as offered by the transmission, remains assured.

The compressed air assistance controls a great part of the force to be spent in shifting—but only to the extent that the driver retains the shifting feel. The manual force to be applied by the driver is reduced by the pneumatic shifting assistance to a fragment of the totally required force. Synchronized transmissions of industrial motor vehicles change in heavy vehicles also to light mechanical transmissions. When driving on inclined roads, the downshift of the transmission becomes extraordinarily simplified, especially in the lower gears, and thereby a considerable contribution is made to the increase in accident protection.

The inventive shifting device can be used in all synchronized transmissions having H-gearshift, double-H-gear shift and superimposed H-gear shift. It also has a sufficient place for attachment to the transmission in the installation space extremely limited by the manufacturer of the vehicle. In case of a required exchange or replacement, the down times for the vehicle operators are gratifyingly short inasmuch as the whole shifting device can be jointly exchanged or assembled without special adjustments being needed for placement in the vehicle. Likewise during the gear shift process, the driver has a steadily detectable feedback to the shifting cycles in the transmission. Due to the existing mechanical connection between the gear shift lever and the synchronization system in the transmission, the driver detects the reactions of the transmission, the same as in a mechanical and non-assisted shifting device. Thus the driver always retains the possibility of engagement in the gear shift cycle and can always discontinue the development of the gear shifting process. In case of failure of the compressed-air assistance, the driver retains, without limitation, the shifting characteristics of the transmission so that in emergency cases he can brake the vehicle by changes of the ratio certainly at increased expenditure of force but reliably.

By an adequate design of the shifting device, the assistance forces it produces to assist the gear shift can be adapted to the shifting system between driver and transmission. The shifting device is firmly attached to the transmission housing so that no relative movements between transmission and shifting device result. There are no longer any moved lines, valves or cylinders between transmission and shifting device. Universal joints and brackets are no longer needed. The shifting device can be replaced without shortening the gear shift linkage. The installation position of the pneumatic servo-assistance device on the shifting device is optional, it can be plugged in or screwed on.

The invention is explained in detail with the aid of the drawings which show:

Figure 1:
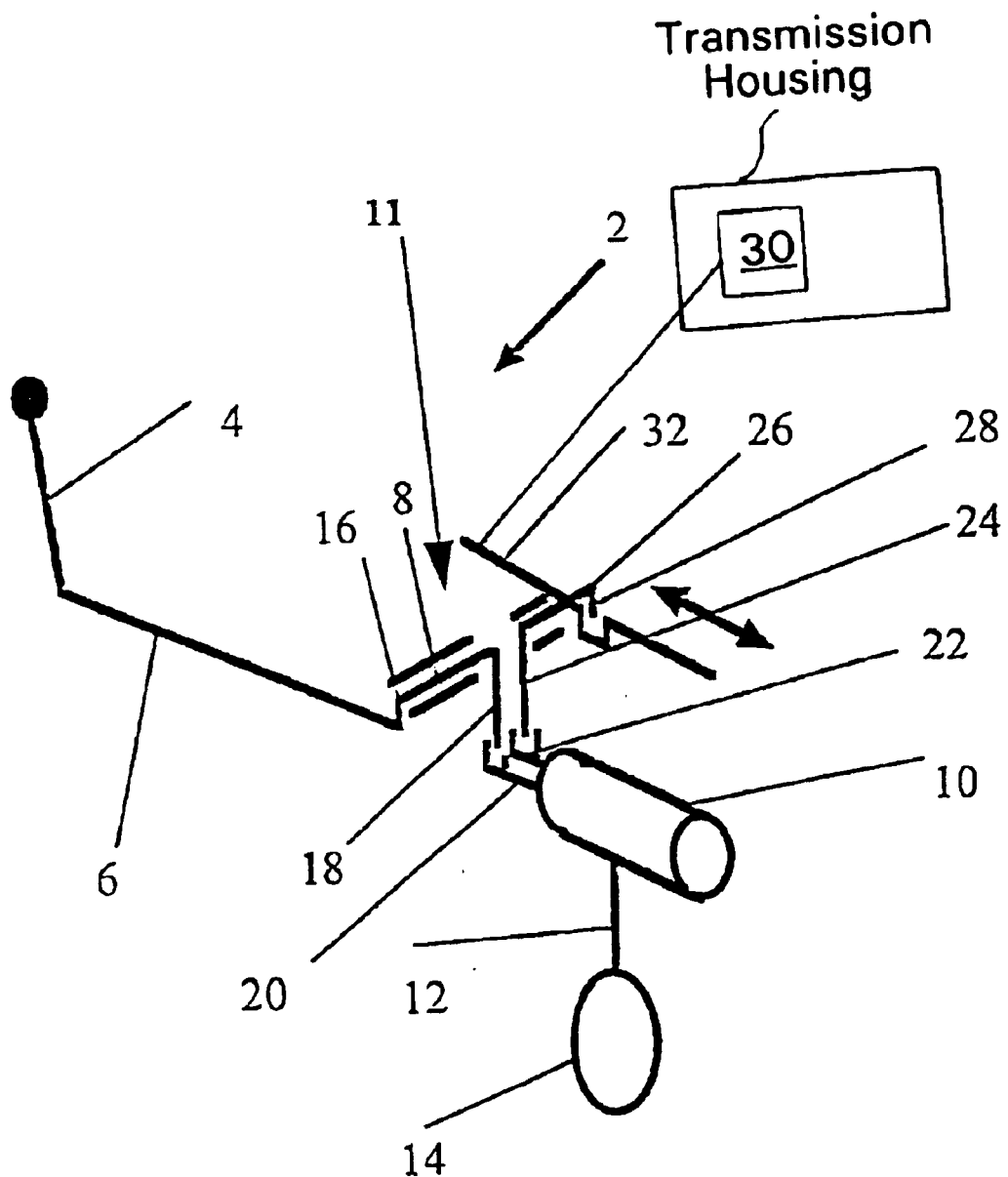
FIG. 1 is a shifting system according to the prior art.

FIG. 1 shows the shifting system 2 of a motor vehicle in a sketch according to the prior art. Starting from a gear shift lever 4, a gear shift rod 6 leads over a relay arm 8 to a shifting device 11 having a pneumatic servo-assistance device 10. The pneumatic servo-assistance device 10 has a connecting line 12 leading to a tank 14 from which the pneumatic servo-assistance device 10 is supplied with compressed air. The relay arm 8 has a first lever 16 connected with the gear shift rod 6, preferably linked. The relay arm 8 has a second level 18 which, in turn, engages in a control rod 20 situated in the pneumatic servo-assistance device 10. In addition, the pneumatic servo-assistance device 10 is provided with a piston rod 22 in which engages a lever 24 which is connected via a rotatable gear shift shaft 26 with a lever 28 in the vehicle transmission 30. The lever 28 engages in a gear shift rail 32 by which reduction ratios of the transmission can be shifted in a manner known per se. A movement of the lever 24 is transmitted via the gear shift shaft 26 to a movement of the lever 28 so that the lever 28 can offset the gear shift rail 32 to an axial movement. During the movement, the gear shift rail 32 preferably assumes three positions, two axial end positions each corresponding to a shifted reduction ratio and, between the end positions, a middle position corresponding to a neutral position of the transmission.

Figure 2:
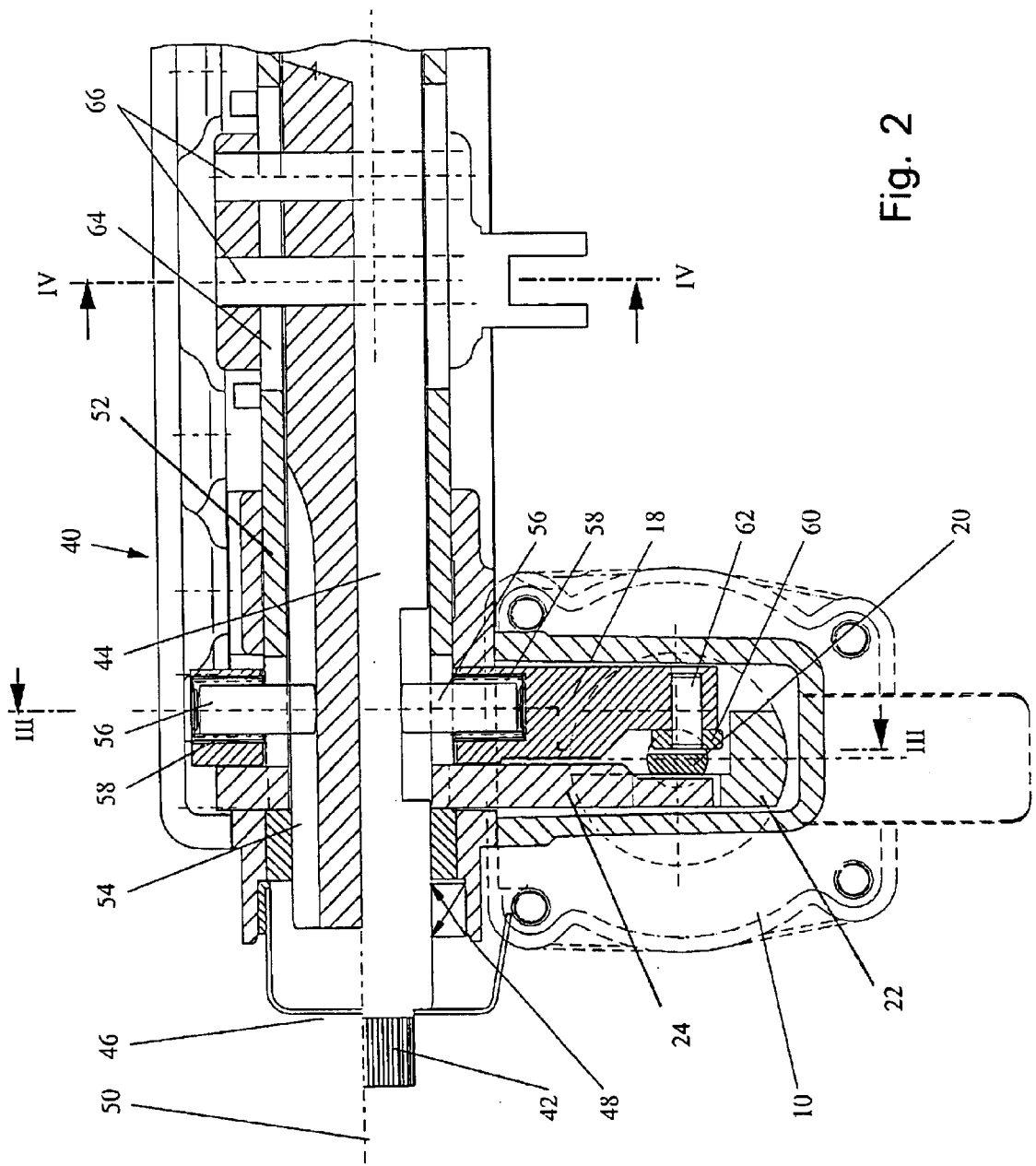
FIG. 2 is a section through the shifting device in top view.

FIG. 2 shows in a top view a section through the inventive shifting device 40. A lever 16 of FIG. 1 (not shown) is non-rotatably connected via a gearing 42 with the central gear shift shaft 44. The gear shift shaft 44 engages by a protective cap 46 through the shifting device 40 and on its periphery is sealed by a shaft packing ring 48. The gear shift shaft is rotatably situated within a hollow shaft 52 around an axis 50. The hollow shaft 52 is rotatable within the shifting device 40 around an axis 50 but non-movably disposed axially along the axis 50. The gear shift shaft 44 has provided on its periphery, along the axis 50, grooves 54. In said grooves engage pins 56 which for their part are turnably situated in a lever 18. To improve the rotatability, the pins 56 are supported in the lever 18 in needle bushings 58. The pins 56 are placed in the grooves 54 in a manner such that an axial displacement of the gearshift shaft 44 along the axis 60 is made possible but a torsion of the gear shift shaft 44 around the axis 50 triggers a swiveling of the lever 18. By virtue of the rotatable support of the pins 56, frictional losses between pins 56 and groves 54 are prevented and an easy axial movement of the gear shift shaft 44 along the axis 50 is possible even if the gear shift shaft 44 is loaded with a torque which sustains itself via the pins 56 on the pneumatic servo-assistance device 10.

The lever 18 has rotatably situated upon a bolt 62 one roller 60 which engages in the control rod 20 of the pneumatic servo-assistance device 10. Hereby are minimized frictional losses between the lever 18 and the control rod 20 whereby a low-friction and almost wear-free transmission of the manual shifting force to the device 11 is possible.

The increased force produced by the pneumatic servo-assistance device 11 is transmitted by the piston rod 22 to the lever 24 and from there to the hollow shaft 52. The hollow shaft 52 has two slotted holes 64. Through said slotted holes 64 project pins 66 which are fastened on the lever 28 which engages in the gear shift rails 32 not shown here. The pins 66 also project through openings 68 in the gear shift shaft 44 and turn around together the gear shift shaft 44 and the hollow shaft 52 (see also FIG. 4). The openings 68 are here provided so that their inner dimensions be larger than the outer dimensions of the pins 66. Thereby a slight torsion play results between the gearshift shaft 44 and the hollowing shaft 52. It is hereby ensured that it be possible to control the servo-assistance device 11 via the gear shift shaft 44 and the lever 18 without the hollow shaft 52 already having to be directly turned along by the gear shift shaft 44. When the adjustment path on the control rod 20 is exceeded, there is nevertheless obtained a reliable bridging of the pneumatic servo-assistance device 11, for ex., when the assistance fails. The slotted holes 64 in the hollow shaft 52 enable the axial displacement of the gear shift shaft 44 within the hollow shaft 52 and of the lever 28 and thus the unhindered and not reinforced selector movement.

Figure 3:
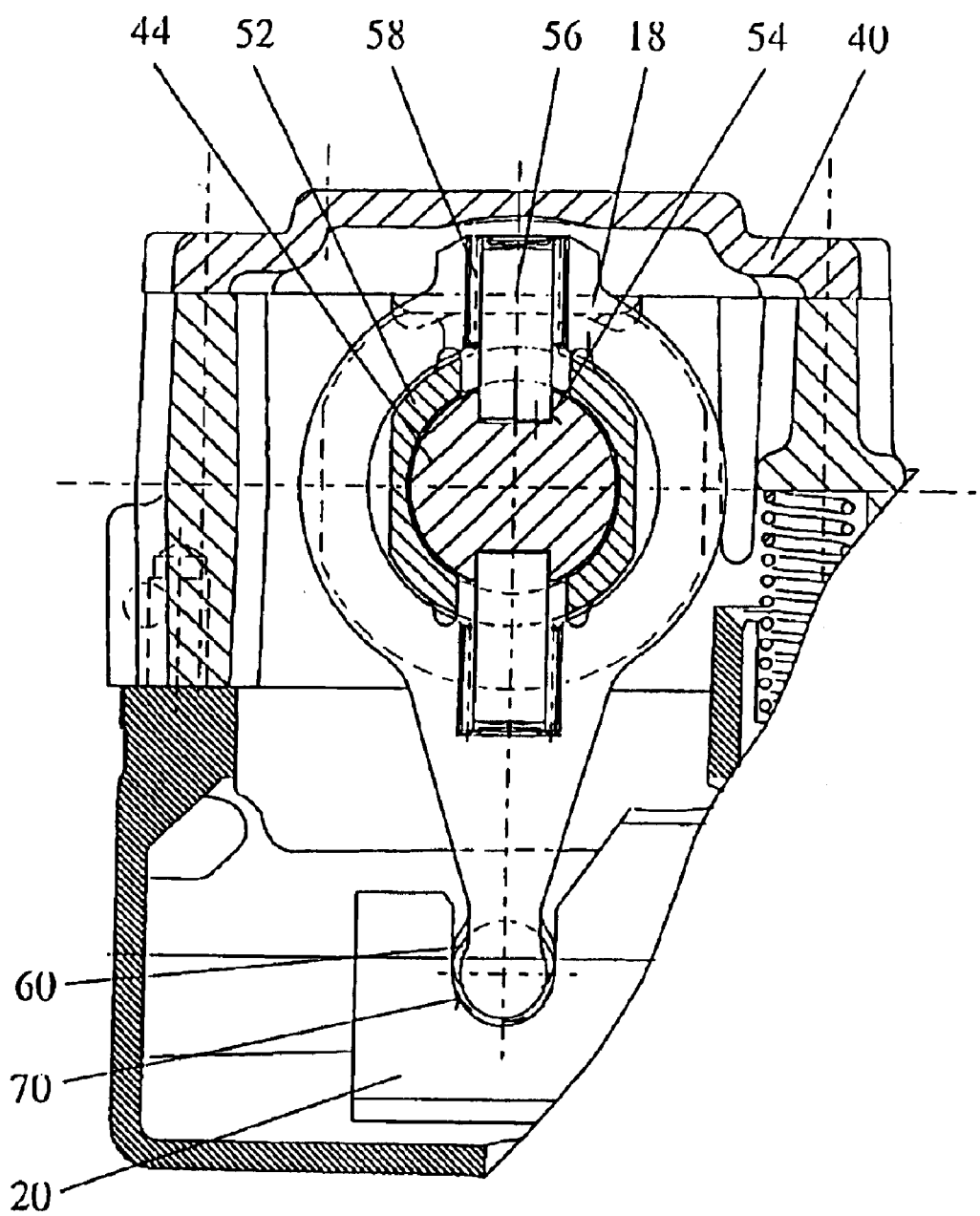
FIG. 3 is a section in front view.

FIG. 3 shows a sideview of the shifting device in section. In the grooves 54 in the gear shift shaft 44 engage the pins 56 which are rotatably supported in needle bushings 58 in the lever 18. The gear shift shaft 44 is surrounded by the hollow shaft 52. The lever 18 engages with a roller 60, which is situated easily rotatably upon a bolt 62, in a pocket 70 in the control rod 20 and makes possible the low-friction transmission of the manual shifting force to the pneumatic servo-assistance device 11.

Figure 4:
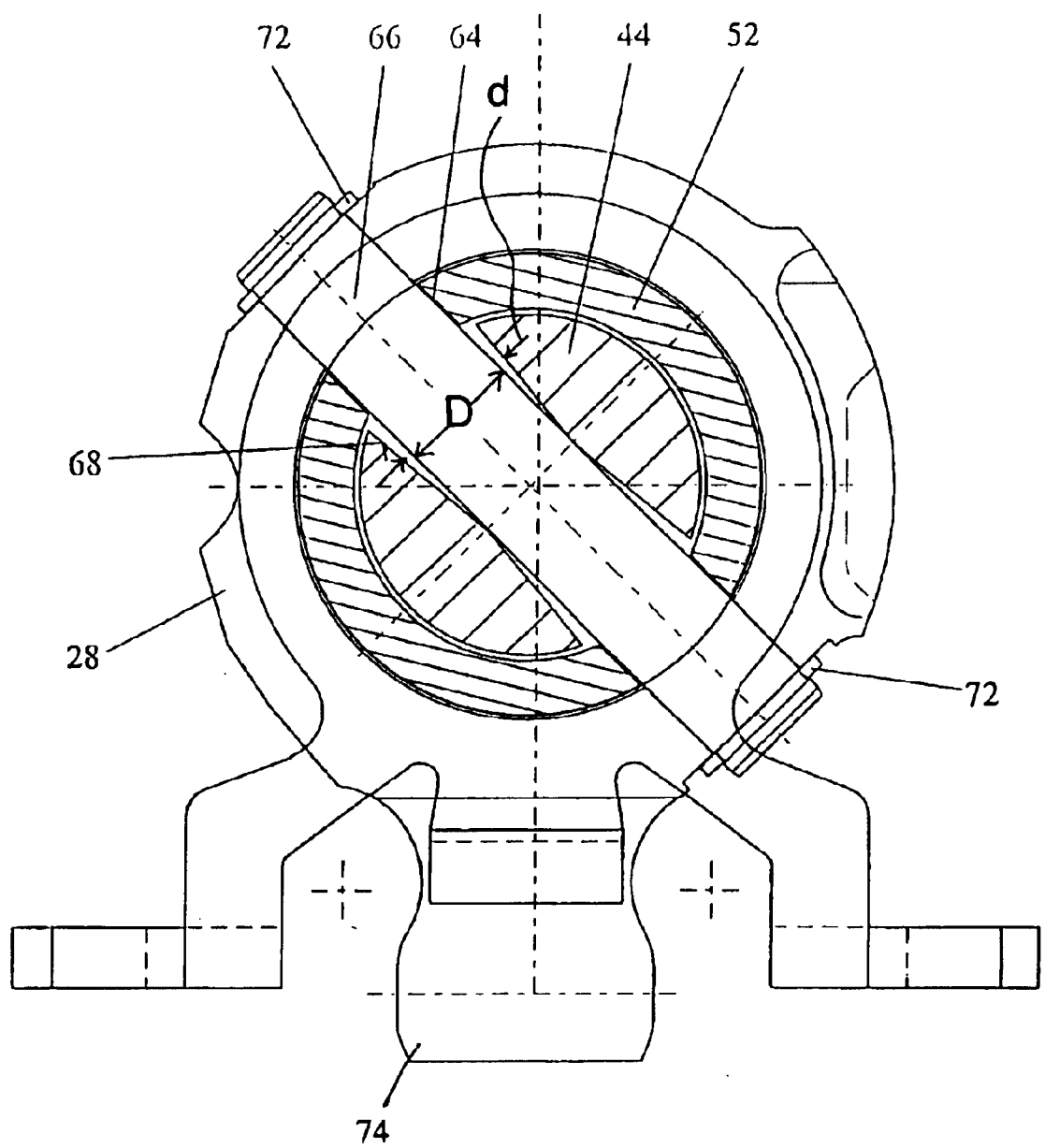
FIG. 4 is a section through the gearshift shaft.

FIG. 4 shows a section through the gear shift shaft in the area of the lever 28 which engages with extensions 74 in gear shift rails 32 not shown here (see FIG. 1). Lever 28, hollow shaft 52 and gear shift shaft 44 are penetrated by pins 66. The inner dimensions d of the opening 68 in the gear shift shaft 44 are larger than the outer dimensions D of the pins 66. The pins 66 are held in place by guard rings 72.

Reference Numerals 2 gear shift system
4 gear shift lever
6 gear shift rod
8 relay arm
10 servo-assistance device
11 shifting device
12 connecting line
14 tank
16 lever
18 lever
20 control rod
22 piston rod
24 lever
26 gear shift shaft
28 lever
30 vehicle transmission
32 gear shift rail
40 shifting device
42 gearing
44 gear shift shaft
46 protective cap
48 shaft packing ring
50 axis
52 hollow shaft
54 groove
56 pin
58 needle bushing
60 roller
62 bolt
64 slotted hole
66 pin
68 opening
70 pocket
72 guard ring
74 extension

What is claimed is:

1. A shifting device (11, 40) having a servo-assist (10) mounted to a transmission housing of a vehicle, the shifting device comprising:

gear shift linkage (4, 6, 16), connected to a first disengaging lever (18) which is further connected with a control rod (20) of said servo-assist (10);

a central gear shift shaft (26, 44), which via a second disengaging lever (28) engages in gear shift rails (32) of a transmission (30);

wherein, the central gear shift shaft (26, 44) is provided which can be rotatably actuated by the gear shift linkage (4, 6, 16) actuated by a driver for transmitting a manual shifting force to the first disengaging lever (18) of said servo-assist (10) and for transmitting the manual shifting force to said gear shift rails (32) of said transmission (30) and which can be movably actuated by said gear shift linkage (4, 6, 16) to select the gear shift rails (32) to be shifted wherein a shifting force supplied by said servo-assist (10) can be transmitted to a hollow shaft (52) which is axially firmly situated in said shifting device (40), surrounds said central gear shift shaft (26, 44) and can be connectably rotated with said central gear shift shaft (26, 44) to shift said gear shift rails (32).

2. The shifting device (11, 40) according to claim 1, wherein in said central gear shift shaft (26, 44) axially aligned grooves (54) are provided in which pins (56) engage to form a non-torsional but axially movable connection of said central gear shift shaft (26, 44) with said first disengaging lever (18) of said servo-assist (10).

3. The shifting device (11, 40) according to claim 2, wherein said pins (56) are rotatably supported in said first disengaging lever (18) of said servo-assist (10).

4. The shifting device, (11, 40) according to claim 3, wherein the rotatable support of said pins (56) is provided by needle bushings (58).

5. The shifting device (11, 40) according to claim 1, wherein a rotatable means (60) is provided between said first disengaging lever (18) of said servo-assist (10) and said control rod (20) of said servo-assist (10).

6. The shifting device (11, 40) according to claim 5, wherein said rotatable means (60) is one roller situated on said first disengaging lever (18).

7. The shifting device (11, 40) according to claim 1, wherein said central gear shift shaft (26, 44), in the area of a connection of said central gear shift (26, 44) with said surrounding hollow shaft (52), has openings (68) for accommodating connecting elements (66) between said central gear shift shaft (26, 44) and said hollow shaft (52), the inner dimensions of said openings (68) of said central gear shift shaft (26, 44) being larger than the outer dimensions of said connecting elements (66) to allow a slight torsional play of said central gear shift shaft (26, 44) relative to said hollow shaft (52) before said hollow shaft (52) is moved along.

8. The shifting device (11, 40) according to claim 1, wherein said shifting device (40) is designed as one structural part which can be adapted as a complete unit to the transmission.

9. A shifting device (11, 40) having a servo-assist (10) mounted toga transmission housing of a vehicle, the shifting device comprising:
   a gear shift linkage (4, 6, 16), connected to a first disengaging lever (18) which is further connected with a control rod (20) of said servo-assist (10);
   a central gear shift shaft (26, 44) which via a second disengaging lever (28) engages in gear shift rails (32) of a transmission (30);
   wherein the central gear shift shaft (26, 44) is provided which can be rotatably actuated by the gear shift linkage (4, 6, 16) actuated by a driver for transmitting a manual shifting force to the first disengaging lever (18) of said servo-assist (10) and for transmitting the manual shifting force to said gear shift rails (32) of said transmission (30) and which can be movably actuated by said gear shift linkage (4, 6, 16) to select the gear shift rails (32) to be shifted wherein the shifting force supplied by said servo-assist (10) can be transmitted to a hollow shaft (52) which is axially firmly situated in said shifting device (40), surrounds said central gear shift shaft (26, 44) and can be rotated with said central gear shift shaft (26, 44) to shift said gear shift rails (32);
   axially aligned grooves (54) in said central gear shift shaft (26, 44) are provided in which pins (56) engage to form a non-torsional but axially movable connection of said central gear shift shaft (26, 44) with said first disengaging lever (18) of said servo-assist (10); and
   wherein said pins (56) are rotatably supported in said first disengaging lever (18) of said servo-assist (10).

10. The shifting devise (11, 40) according to claim 9, wherein the rotatable support of said pins (56) is provided by needle bushings (58).

11. The shifting device (11, 40) according to claim 9, wherein a rotatable means (60) is provided between said first disengaging lever (18) of said servo-assist (10) and said control rod (20) of said servo-assist (10).

12. The shifting device (11, 40) according to claim 11, wherein said rotatable means (60) is one roller situated on said first disengaging lever (18).

13. The shifting device (11, 40) according to claim 9, wherein said central gear shift shaft (44), in the area of a connection of said central gear shift shaft (26, 44) with said surrounding hollow shaft (52), has openings (68) for accommodating connecting elements (66) between said central gear said hollow shaft (52), the inner dimensions of said openings (68) of central gear shift shaft (26, 44) being larger than the outer dimensions of said connecting elements (66) to allow a slight torsional play of said central gear shift shaft (26, 44) relative to said hollow shaft (52) before said hollow shaft (52) is moved along.

14. The shifting device (11, 40) according to claim 9, wherein said shifting device (40) is designed as one structural part which can be adapted as a complete unit to the transmission.

15. A shifting device (11 40) having a servo-assist (10) mounted to a transmission housing of a vehicle, the shifting device comprising:
   a gear shift linkage (4, 6, 16), connected to a first disengaging lever (18) which is further connected with a control rod (20) of said servo-assist (10);
   a central gear shift shaft (26, 44) which via a second disengaging lever (28) engages in gear shift rails (32) of a transmission (30);
   wherein the central gear shift shaft (26, 44) is provided which can be rotatably actuated by the gear shift linkage (4, 6, 16) actuated by a driver for transmitting a manual shifting force to the first disengaging lever (18) of said servo-assist (10) and for transmitting the manual shifting force to said gear shift rails (32) of said transmission (30) and which can be movably actuated by said gear shift linkage (4, 6, 16) to select the gear shift rails (32) to be shifted wherein a shifting force supplied by said servo-assist (10) can be transmitted to a hollow shaft (52) which is axially firmly situated in said shifting device (40), surrounds said central gear shift shaft (26, 44) and can be rotated with said central gear shift shaft (26, 44) to shift said gear shift rails (32) and;
   axially aligned grooves (54) are provided in said central gear shift shaft (26, 44) in which pins (56) engage to form a non-torsional but axially movable connection of said central gear shift shaft (44) with said first disengaging lever (18) of said servo-assist (10).

* * * * *